(12) United States Patent
Liao et al.

(10) Patent No.: US 11,911,951 B2
(45) Date of Patent: Feb. 27, 2024

(54) MATTE FILM FOR HOT PRESSING AND MANUFACTURING METHOD THEREOF

(71) Applicant: NAN YA PLASTICS CORPORATION, Taipei (TW)

(72) Inventors: Te-Chao Liao, Taipei (TW);
Wen-Cheng Yang, Taipei (TW);
Wen-Jui Cheng, Taipei (TW);
Chia-Yen Hsiao, Taipei (TW);
Chien-Chih Lin, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 536 days.

(21) Appl. No.: 17/012,204

(22) Filed: Sep. 4, 2020

(65) Prior Publication Data
US 2021/0252768 A1    Aug. 19, 2021

(30) Foreign Application Priority Data

Feb. 6, 2020 (TW) .................. 109103764

(51) Int. Cl.
| | | |
|---|---|---|
| *B32B 27/08* | (2006.01) | |
| *B32B 27/36* | (2006.01) | |
| *B32B 7/02* | (2019.01) | |
| *B32B 27/20* | (2006.01) | |
| *C08K 3/36* | (2006.01) | |
| *C08K 13/02* | (2006.01) | |
| *C08K 5/10* | (2006.01) | |
| *B29C 55/14* | (2006.01) | |
| *B29C 55/00* | (2006.01) | |
| *C08K 5/00* | (2006.01) | |
| *C08K 5/103* | (2006.01) | |
| *C08K 3/013* | (2018.01) | |
| *B29K 67/00* | (2006.01) | |

(52) U.S. Cl.
CPC .......... *B29C 55/143* (2013.01); *B29C 55/005* (2013.01); *B32B 27/08* (2013.01); *B32B 27/36* (2013.01); *C08K 3/013* (2018.01); *C08K 3/36* (2013.01); *C08K 5/005* (2013.01); *C08K 5/0083* (2013.01); *C08K 5/103* (2013.01); *C08K 13/02* (2013.01); *B29K 2067/00* (2013.01); *B29K 2995/0024* (2013.01); *B32B 2250/02* (2013.01); *B32B 2250/244* (2013.01); *B32B 2307/408* (2013.01); *B32B 2307/732* (2013.01); *C08K 2201/005* (2013.01)

(58) Field of Classification Search
None
See application file for complete search history.

(56) References Cited

U.S. PATENT DOCUMENTS

2003/0069339 A1*  4/2003  Takenaka ............. C08G 63/183
                                                          524/222
2020/0270395 A1   8/2020  Peer et al.

FOREIGN PATENT DOCUMENTS

| JP | 200499671 A | 4/2004 |
|---|---|---|
| JP | 200819338 A | 1/2008 |
| JP | 200819339 A | 1/2008 |
| JP | 2010221412 A | 10/2010 |
| JP | 2016153228 A | 8/2016 |
| JP | 2021501238 A | 1/2021 |
| TW | 200827403 A | 7/2008 |
| TW | I499626 B | 9/2015 |

* cited by examiner

*Primary Examiner* — Sheeba Ahmed
(74) *Attorney, Agent, or Firm* — Li & Cai Intellectual Property (USA) Office

(57) ABSTRACT

A matte film for hot pressing and a manufacturing method thereof are provided. The manufacturing method includes steps of forming at least one polyester composition into an unstretched polyester thick film and stretching the unstretched polyester thick film in a machine direction (MD) and a transverse direction (TD). The polyester composition includes 81% to 97.9497% by weight of a polyester resin, 0.02% to 2% by weight of an antioxidative ingredient, 0.0003% to 1% by weight of a nucleating agent, 0.01% to 2% by weight of a flow aid, 0.01% to 2% by weight of a polyester modifier, 0.01% to 2% by weight of an inorganic filler, and 2% to 10% by weight of silica particles. The polyester resin has an intrinsic viscosity between 0.60 dl/g and 0.80 dl/g.

6 Claims, 1 Drawing Sheet

MATTE FILM FOR HOT PRESSING AND MANUFACTURING METHOD THEREOF

CROSS-REFERENCE TO RELATED PATENT APPLICATION

This application claims the benefit of priority to Taiwan Patent Application No. 109103764, filed on Feb. 6, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a polyester film, and more particularly to a matte film for hot pressing and a manufacturing method for the same.

BACKGROUND OF THE DISCLOSURE

Polyesters, for example, polyethylene terephthalate, polyethylene 2,6-naphthalene dicarboxylate, etc., show exemplary performance in moldability, mechanical properties, thermal properties, electrical properties, chemical resistance, and so forth. Accordingly, polyesters can be used for different purposes, such as being used as an optical film, an electrical insulating film, a barrier film, a release film, a protective film, an agricultural film, a packaging material, and a heat insulation film.

However, when a polyester film is used as part of a device or is processed in a high temperature environment (for example, hot pressing), the polyester film is prone to not only bleaching but also cracking, and has obvious thermal contraction characteristics such that a size of the film is unstable. Furthermore, a large amount of oligomer may possibly precipitate on a surface of the film, and the aforementioned conditions may limit the application of the polyester film.

SUMMARY OF THE DISCLOSURE

In response to the above-referenced technical inadequacies, the present disclosure provides a matte film for hot pressing, which can be used in high temperatures, and a manufacturing method thereof.

In one aspect, the present disclosure provides a manufacturing method of a matte film for hot pressing, which includes the steps of forming at least one polyester composition into an unstretched polyester thick film and stretching the unstretched polyester thick film in the machine direction (MD) and the transverse direction (TD). The polyester composition includes 81% to 97.9497% by weight of a polyester resin, 0.02% to 2% by weight of an antioxidative ingredient, 0.0003% to 1% by weight of a nucleating agent, 0.01% to 2% by weight of a flowing aid, 0.01% to 2% by weight of a polyester modifier, 0.01% to 2% by weight of an inorganic filler and 2% to 10% by weight of silica particles. The polyester resin has an intrinsic viscosity between 0.60 dl/g and 0.80 dl/g.

In another aspect, the present disclosure provides a matte film for hot pressing, which includes a substrate layer and at least one surface layer. The at least one surface layer is formed on at least one surface of the substrate layer, and the substrate layer and the at least one surface layer are each formed from a polyester composition. The polyester composition includes 81% to 97.9497% by weight of a polyester resin, 0.02% to 2% by weight of an antioxidative ingredient, 0.0003% to 1% by weight of a nucleating agent, 0.01% to 2% by weight of a flowing aid, 0.01% to 2% by weight of a polyester modifier, 0.01% to 2% by weight of an inorganic filler and 2% to 10% by weight of silica particles. The polyester resin has an intrinsic viscosity between 0.60 dl/g and 0.80 dl/g.

One of the effects of the present disclosure is that the matte film for hot pressing, in which the substrate layer and the surface layer are each formed from a polyester composition that includes specific amounts of a polyester resin having an intrinsic viscosity between 0.60 dl/g and 0.80 dl/g, an antioxidative ingredient, a nucleating agent, a flowing aid, a polyester modifier and an inorganic filler, have can be increased in adaptability and prevent oligomers from precipitating on a film surface.

Furthermore, in the presence of a polyester modifier with a specific structure, thermal shrinkage of the polyester film and the movement of oligomers can be suppressed.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
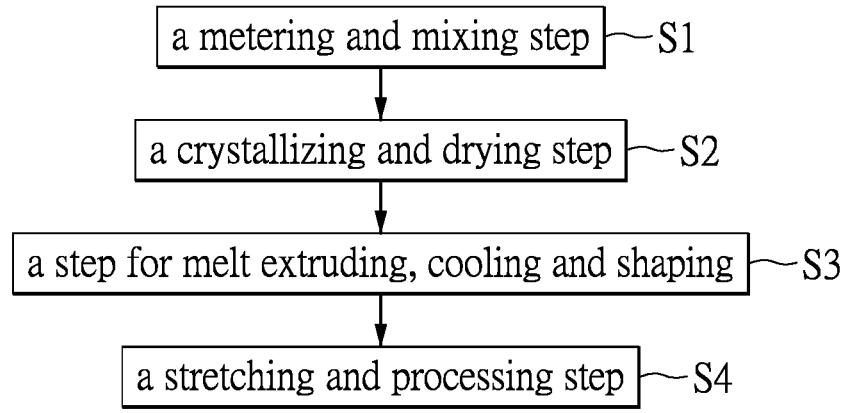
FIG. 1 is a flowchart of a manufacturing method of a matte film for hot pressing of the present disclosure.

Polyester films have a wide range of uses. In consideration of mechanical, electrical, and thermal properties, the polyester films can serve as barrier films for batteries (e.g., automotive batteries, fuel cells, and lithium batteries), barrier films for pressing molds, mold releasing films, high temperature resistant release films and matte films for hot pressing. Therefore, the present disclosure provides a technical solution that is capable of improving heat resistance and dimensional stability of the polyester film and can suppress the precipitation of polyester oligomers.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Unless defined otherwise, all technical and scientific terms used herein have the same meanings as commonly understood by one of ordinary skill in the art to which this invention belongs. As used herein, the singular forms "a," "an," and "the," are intended to include the plural forms.

Unless indicated otherwise, all percentages disclosed herein are weight percentages. When a range of upper and lower limits is provided, all combinations in the mentioned range are covered by the scope of the present disclosure as if the combinations were individually listed.

Referring to FIG. 1, a manufacturing method of a matte film for hot pressing mainly includes: step S1, i.e., a metering and mixing step, metering and mixing all required ingredients to form at least one polyester composition; step S2, i.e., a crystallizing and drying step, performing a crystallizing and drying process that is at a temperature from 120° C. to 180° C. on the polyester composition; step S3, i.e., a step for melt extrusion, cooling and shaping, melting and extruding the polyester composition and casting and cooling the resulting extrudate to obtain an unstretched polyester thick film; and step S4, i.e., a stretching and processing step, preheating and stretching the unstretched polyester thick film and heat shrinking (also called "pre shrinking") the resulting stretched polyester film in the transverse direction and/or the machine direction. In order to provide properties required for a target object, the polyester composition includes 81% to 97.9497% by weight of a polyester resin, 0.02% to 2% by weight of an antioxidative ingredient, 0.0003% to 1% by weight of a nucleating agent, 0.01% to 2% by weight of a flowing aid, 0.01% to 2% by weight of a polyester modifier, 0.01% to 2% by weight of an inorganic filler and 2% to 10% by weight of silica particles. It is worth mentioning that the formula of the polyester composition can directly produce the technical effects of increasing heat resistance, preventing the formation of large crystalline particles, and inhibiting the movement of polyester oligomers.

More specifically, the polyester resin may be formed by one or more diacids and one or more diols. The diacid(s) may be an aromatic diacid, an alicyclic diacid, or a combination thereof. The diol(s) may be an aromatic diol, an aliphatic diol, an alicyclic diol or a combination thereof.

Specific examples of the aromatic diacid include terephthalic acid, isophthalic acid, phthalic acid, naphthalene dicarboxylic acid, diphenyl sulfone dicarboxylic acid, diphenyl ether dicarboxylic acid, diphenyl ketone dicarboxylic acid, phenylindane dicarboxylic acid, sodium isophthalate sulfonate, and dibromoterephthalic acid. Specific examples of the alicyclic diacid include oxalic acid, succinic acid, adipic acid, azelaic acid, sebacic acid, and dimer acid. The diol(s) may be an aromatic diol, an aliphatic diol, an alicyclic diol, or a combination thereof.

Specific examples of the aromatic diol include naphthalenediol, 2,2-bis(4-hydroxydiphenyl)propane, 2,2-bis(4-hydroxyethoxyphenyl)propane, bis(4-hydroxyphenyl) sulfone, and hydroquinone. Specific examples of the aliphatic diol include ethylene glycol, propylene glycol, 1,4-butanediol, hexanediol, neopentyl glycol, and diethylene glycol. Specific examples of the alicyclic diol include cyclohexanedimethanol and cyclohexanediol.

In certain embodiments, the polyester resin may be selected from polyethylene terephthalate (PET), polytrimethylene terephthalate (PPT), polybutylene terephthalate (PBT), polyethylene naphthalate (PEN), polybutylene naphthalate (PBN), polycyclohexylenedimethylate terephthalate (PCT), polycarbonate (PC) or polyarylate, and preferably PET. The polyester resin has an intrinsic viscosity between 0.60 dl/g and 0.80 dl/g, and preferably between 0.65 dl/g and 0.75 dl/g. Accordingly, when shaped, the loads on the polyester resin (e.g., loads caused by a surrounding environment and external forces) can be reduced. Furthermore, the heat generated by a shearing force can be reduced when processed, so as to avoid thermal decomposition of the polyester resin.

The antioxidative ingredient includes 0.01% to 1% by weight of a primary antioxidant and 0.01% to 1% by weight of a secondary antioxidant. It is worth mentioning that, the primary antioxidant and the secondary antioxidant can produce a synergistic effect so as to provide better antioxidative effect. More specifically, the primary antioxidant can quickly react with peroxy radicals (ROO·) to stop free radical chain reactions. The secondary antioxidant can react with hydroperoxides (ROOH) to convert them into substances that are free of free radicals and non-reactive. The primary antioxidant may be selected from phenolic compounds or amine compounds, which are exemplified by commercially available products with trade names of Irganox 1010, Irganox 1425, Irganox 245, Anox 1315, Anox PP18, Anox 20, Lowinox 1790, Lowinox TBM-68, and Naugard 445. The secondary antioxidant may be selected from phosphorous compounds or thioester compounds, which are exemplified by commercially available products with trade names of Sandostab P-EPQ, Irgafos 168, and Naugard 412S.

The nucleating agent can increase total crystallinity and improve the heat resistance of a polyester film. Furthermore, the nucleating agent can promote crystal growth, which results in fine crystals, reduces the formation of large spherulites, and avoids the embrittlement of film surfaces. The nucleating agent may be a mineral material, a metal oxide, a silicon compound, a metal salt of an organic or inorganic acid, a phosphate ester metal salt, a polyol derivative, a sulfonylimide compound, a glass powder, a metal powder, or any combination thereof. Specific examples of the mineral material include graphite, talc and, kaolin. Specific examples of the metal oxide include zinc oxide, aluminum oxide, and magnesium oxide. Specific examples of the silicon compound include silicon oxide, calcium silicate, and magnesium silicate. Specific examples of the metal salt of an organic or inorganic acid include metal carbonates such as magnesium carbonate, calcium carbonate, sodium carbonate and potassium carbonate, barium sulfate, calcium sulfate, sodium benzoate, and aluminum p-tert-butylbenzoate. The phosphate ester metal salt is exemplified by an aromatic phosphate ester metal salt. The polyol derivative is exemplified by dibenzylidene sorbitol. In consideration of heat resistance, the nucleating agent is preferably an inorganic material.

The flow aid can effectively reduce mechanical torque on a polyester material when melt-extruded, and can reduce a molecular chain scission of a polymer. The flow aid can be pentaerythritol stearate (PETS) or its analogues, which have good thermal stability, low volatility, good mold release, and flow properties at high temperatures, and allow good nucleation effect on a partial crystalline polyester.

The polyester modifier can effectively prevent the formation of large crystalline particles to increase the toughness of a polyester film. Therefore, in the presence of the polyester modifier, the thermal shrinkage of the polyester film and the movement of oligomers can be suppressed. In certain embodiments, the polyester modifier has a structure represented by formula (I):

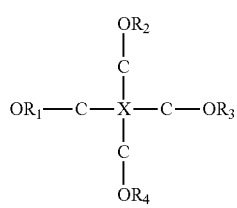

formula (I)

In formula (I), X represents an aliphatic carbon chain or an aromatic carbon chain containing 1 to 5 carbon atoms, and $R_1$ to $R_4$ each represent a hydrogen atom or an aliphatic carbon chain containing 1 to 15 carbon atoms.

In certain embodiments, the polyester modifier has a structure represented by formula (II):

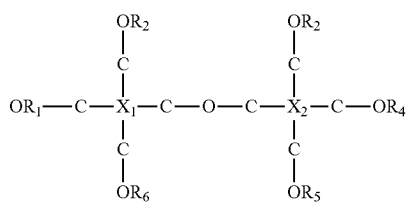

formula (II)

In formula (II), wherein $X_1$ and $X_2$ each represent an aliphatic carbon chain or an aromatic carbon chain containing 1 to 5 carbon atoms, and $R_1$ to $R_6$ each represent a hydrogen atom or an aliphatic carbon chain containing 1 to 15 carbon atoms.

In certain embodiments, the polyester modifier has a structure represented by formula (III):

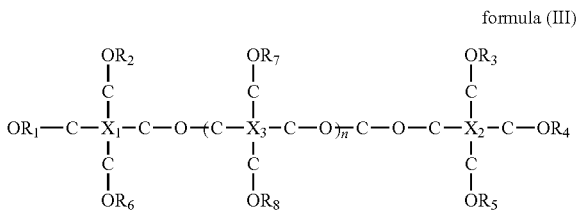

formula (III)

In formula (III), $X_1$ to $X_3$ each represent an aliphatic carbon chain or an aromatic carbon chain containing 1 to 5 carbon atoms, $R_1$ to $R_8$ each represent a hydrogen atom or an aliphatic carbon chain containing 1 to 15 carbon atoms, and n is a positive integer of 1 or more, and preferably a positive integer from 1 to 3.

The inorganic polyester modifier can increase the heat resistance of a polyester film, and can hinder the movement of oligomers. Furthermore, in the presence of the inorganic polyester modifier, the polyester film can have desired surface roughness and haze value. In certain embodiments, the inorganic polyester modifier includes inorganic filler particles having an average particle size from 5 μm to 10 μm. Specific examples of the inorganic filler particles include silicon dioxide ($SiO_2$), titanium dioxide ($TiO_2$), aluminum hydroxide ($Al(OH)_3$), aluminum oxide ($Al_2O_3$), magnesium hydroxide ($Mg(OH)_2$), magnesium oxide (MgO), calcium carbonate ($CaCO_3$), boron oxide ($B_2O_3$), calcium oxide (CaO), strontium titanate ($SrTiO_3$), barium titanate ($BaTiO_3$), calcium titanate ($CaTiO_3$), magnesium titanate ($2MgO \cdot TiO_2$), cerium oxide ($CeO_2$), fumed silica, talc, barium carbonate, calcium sulfate, barium sulfate, lithium phosphate, calcium phosphate, magnesium phosphate, boron nitride (BN), aluminum nitride (AlN), carbon black, and kaolin.

Step S1 is a metering and mixing step, in which general masterbatches of substrate and surface layers are uniformly mixed with respective functionally modified polyester masterbatches resulted from at least one additive (e.g., a nucleating agent) in a metered manner. Thus, mixed polyester materials of the substrate and surface layers are obtained. In practice, the at least one additive of the functionally modified polyester grains can be added in a polymerization or blending process.

Step S2 is a crystallizing and drying step, in which a crystallizing and drying process at a temperature from 120° C. to 180° C. is performed on a polyester material (i.e., a polyester composition). Thus, the polyester material has a water content less than 30 ppm. The process time of the crystallizing and drying process can be from 3 to 8 hours, but it is not limited thereto.

Step S3 is a step for melt extrusion, cooling and molding, in which the polyester material is melt-extruded and the resulting extrudate is cooled and shaped to form an unstretched polyester thick film More specifically, the polyester material can be formed into a melt with fluidity in a single-layered extrusion or multi-layered co-extrusion manner, which can be achieved by a twin screw extruder. After that, the melt is cast into a film to form between casting rolls and cooled for solidification. However, these details are provided for exemplary purposes only and are not meant to limit the scope of the present disclosure.

The step S4 is a stretching and processing step, in which the unstretched polyester thick film is preheated and stretched, and then the resulting stretched polyester film is heat shrunk in the transverse direction and/or the machine direction. In practice, a sequential or simultaneous biaxial stretching process can be used in step S4. It is worth mentioning that, under specific stretch conditions, a crystal orientation of the polyester film can be completed, and the polyester film can have a very low thermal shrinkage rate in both the machine direction and the transverse direction in a high temperature environment.

More specifically, the unstretched polyester thick film is stretched in the machine direction (MD) (also called a "length direction") at a stretch ratio from 2 to 6 times and a temperature from 70° C. to 145° C. to form a uniaxially stretched polyester film. The uniaxially stretched polyester film is then stretched in the transverse direction (TD) (also called "width direction") at a stretch ratio from 2 to 6 times and a temperature from 90° C. to 160° C. to form a biaxially stretched polyester film According to practical requirements, the stretching processes of the machine direction and the transverse direction can be performed in the reverse order.

Furthermore, the unstretched polyester thick film can be simultaneously and biaxially stretched. More specifically, the unstretched polyester thick film can be simultaneously stretched in the machine direction and the transverse direction at a stretch ratio from 2 to 6 times and a temperature from 70° C. to 160° C., so as to directly form the biaxially stretched polyester film.

It is worth mentioning that, step S4 includes heat shrinking the biaxially stretched polyester film in the transverse direction and/or the machine direction, which can increase the crystallinity of the polyester film and improve the shrinkage stress of the polyester film More specifically, in the heat shrinking process, two ends of the polyester film in the width or length direction can be clamped by clamping fixtures, and thus the polyester film can be repeatedly stretched and relaxed. The extent of every stretching action is 500% and the extent of every relaxing action is 10%. Therefore, the thermal shrinkage of the polyester at high temperatures can be effectively suppressed. That is, the thermal dimensional stability of the polyester film can be increased without any additional heat treatment after the stretching process.

Figure 2:
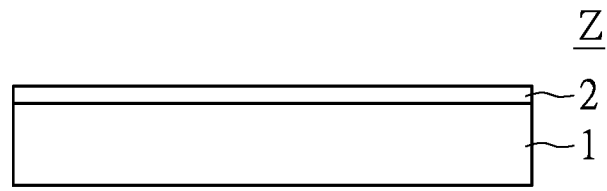
FIG. 2 is a structural schematic view of the matte film for hot pressing of the present disclosure.
Figure 3:
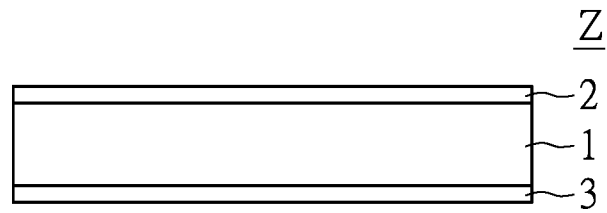
FIG. 3 is another structural schematic view of the matte film for hot pressing of the present disclosure.

Reference is made to FIG. 2 and FIG. 3, a polyester film Z (hereinafter referred to as "a matte film for hot pressing") obtained by the manufacturing method of the present disclosure can include a substrate layer 1 and a first surface layer 2 formed on a surface (e.g., an upper surface) of the substrate layer 1, as shown in FIG. 2. Also, the matte film Z can include a substrate layer 1, a first surface layer 2 formed on a surface (e.g., an upper surface) of the substrate layer 1, and a second surface layer 3 formed on another opposite surface (e.g., a lower surface) of the substrate layer 1, as shown in FIG. 3. In an alternative embodiment (not shown), the matte film Z can be a single-layered structure.

More specifically, the substrate layer 1 includes 81% to 97.9497% by weight of a polyester resin, 0.02% to 2% by weight of an antioxidative ingredient, 0.0003% to 1% by weight of a nucleating agent, 0.01% to 2% by weight of a flowing aid, 0.01% to 2% by weight of a polyester modifier, and 0.01% to 2% by weight of an inorganic filler. The polyester resin has an intrinsic viscosity between 0.60 dl/g and 0.80 dl/g, and preferably between 0.65 dl/g and 0.75 dl/g. In consideration of heat resistance and movement suppression of oligomers, the first surface layer 2/second surface layer 3 further includes 2% to 10% by weight of silica particles, each of which has a particle size between 5 μm and 10 μm, preferably 6 μm.

The total thickness of the matte film Z is between 15 μm and 350 μm, and the thickness of the first surface layer 2 or the second surface layer 3 is 2% to 30% of the total thickness of the matte film Z, preferably 3% to 20%, and more preferably 4% to 15%. Therefore, the matte film Z has good processability and good effect on suppressing the movement of oligomers. If the thickness ratio of the first or second surface layer 2, 3 relative to the total thickness of the matte film Z is less than 2%, the oligomers would easily move to a surface of the film Thus, once the matte film Z is heated, a large amount of cyclic oligomer(s) would precipitate on the surface of the film, affecting the appearance of the film. If the thickness ratio of the first or second surface layer 2, 3 relative to the total thickness of the matte film Z exceeds 30%, although the matte film Z has a good effect on suppressing the movement of oligomers to the surface of the film, film processability is insufficient and is high in cost. It is worth mentioning that, in specific amounts of the inorganic polyester modifier and the silica particles, the matte film Z has an arithmetic mean roughness Ra of 0.1-0.4 μm and a ten-point average roughness Rz of 1-8 μm. Therefore, the matte film Z can have stable and good peelability, such that no stickiness occurs during hot pressing.

Property Evaluation

Polyester films of Examples 1 to 5 and Comparative Examples 1 and 2 are obtained by steps S1 to S4 mentioned above, which uses processing conditions as shown in Table 1. The polyester films all have an A/B/A structure (three-layered structure), in which A represents a surface layer and B represents a substrate layer. The thicknesses of the substrate and surface layers are shown in Table 1. Also, in each of the substrate and surface layers, the intrinsic viscosity of a polyester masterbatch and the amounts of functional additives are shown in Table 1. The polyester films are tested for key physical properties by the following test methods, and the results are as shown in Table 1.

Test of Visible Light Transmittance and Haze:

A testing device (model name "TC-HIII DPK", produced by Tokyo Denshoku Co., Ltd., Japan) was used to test the visible light transmittance and haze value of the polyester films of Examples 1 to 5 and Comparative Examples 1 and 2 in accordance with a JIS K7705 standard before and after being heated. Also, a variation in haze (Δhaze) of each of the polyester films was calculated. In this test, an oven is used for heating and the heating temperature is at 210° C. for 3 hours.

Test of Thermal Shrinkage Properties:

Polyester films of Examples 1 to 5 and Comparative Examples 1 and 2 were each cut into a square shape of 15 cm×15 cm. After being heated in an oven at 210° C. for 3 hours, the lengths of the polyester films in the machine direction (MD) and the transverse direction (TD) were measured. Also, the variation in each of the length after being heated was calculated. The thermal shrinkage rates of the lengths of the polyester films in the machine direction (MD) and the transverse direction (TD) can be obtained by the following ways: dividing each of the measured length variations in the machine direction (MD) by the original length (i.e., 15 cm) and then multiplying by 100%, and dividing each of the measured length variations in the transverse direction (TD) by the original length (i.e., 15 cm) and then multiplying by 100%.

Test of Roughness:

According to the JIS-B0601 and B0651 of international testing standards, a 3D surface roughness measurement instrument (produced by Kosaka Laboratory Ltd., product name: SURF CORDER SE-3CK) was used. Conditions for the measurement include R2ym of stylus tip, a sweep span of 2μπι, a sweep length of 1 mm, scanning lines with a quantity of 100, a cut-off value of 0.25 mm, and a magnification of 5,000×, the results regarding the arithmetic mean roughness Ra and the ten-point average roughness Rz of the polyester films of Examples 1 to 5 and Comparative Examples 1 and 2 were recorded, as shown in Table 1.

Test of Hot Pressing:

Polyester films of Examples 1 to 5 and Comparative Examples 1 and 2, the copper foils (produced by Nanya Plastics Corporation.), and the resin substrate NPG-170N (produced by the Nanya Plastics Corporation.) are disposed and hot-pressed between steel plates. The polyester films were disposed on a pressing surface of one of the steel plates; the copper foils were disposed on the pressing surface of the other one of the steel plates, and the resin substrates are sandwiched between the steel plates. The temperature for hot pressing ranges between 170-200° C./1 hr (1.5 hours for heating up and cooling down). The pressure condition falls in the range of 35-40 kg/cm$^2$. After the steel plates are separated from each other, it is observed whether any visible ruptures are present on the polyester films and the results are recorded in Table 1.

| | Items | Example 1 | Example 2 | Example 3 | Example 4 | Example 5 | Comparative Example 1 | Comparative Example 2 |
|---|---|---|---|---|---|---|---|---|
| Film | Total thickness (μm) | 30 | 50 | 125 | 250 | 350 | 125 | 125 |
| | Co-extruded structure | A/B/A | A/B/A | A/B/A | A/B/A | A/B/A | A/B/A | A/B/A |
| | Thickness of each layer (μm) | 5/20/5 | 5/40/5 | 6/113/6 | 12/226/12 | 18/314/18 | 6/113/6 | 6/113/6 |
| Ingredients of A layer | Silica particles having an average particle size of 6 μm (wt %) | 2.5 | 2.5 | 3.5 | 3.5 | 4 | 3.5 | 3.5 |
| | Primary antioxidant (ppm) | 3000 | 8000 | 5000 | 1500 | 200 | — | 5000 |
| | Secondary antioxidant (ppm) | 3000 | 8000 | 5000 | 1500 | 200 | — | 5000 |
| | Nucleating agent (ppm) | 30 | 500 | 1500 | 3000 | 3000 | — | — |
| | Flowing aid (ppm) | 30 | 500 | 1500 | 3000 | 3000 | — | — |
| | polyester modifier (ppm) | 1000 | 3000 | 2500 | 700 | 3500 | — | — |
| | Inorganic filler (ppm) | 3000 | 1000 | 1500 | 3300 | 500 | — | — |
| Ingredients of B layer | Primary antioxidant (ppm) | 3000 | 8000 | 5000 | 1500 | 200 | — | 5000 |
| | Secondary antioxidant (ppm) | 3000 | 8000 | 5000 | 1500 | 200 | — | 5000 |
| | Nucleating agent (ppm) | 30 | 500 | 1500 | 3000 | 3000 | — | — |
| | Flowing aid (ppm) | 30 | 500 | 1500 | 3000 | 3000 | — | — |
| | polyester modifier (ppm) | 1000 | 3000 | 2500 | 700 | 3500 | — | — |
| | Inorganic filler (ppm) | 3000 | 1000 | 1500 | 3300 | 500 | — | — |
| Processing conditions | Drying temperature of crystallization (° C./hours) | 140/4 | 140/4 | 140/4 | 140/4 | 140/4 | 140/4 | 140/4 |
| | Temperature of extruder (° C.) | 295 | 295 | 295 | 295 | 295 | 295 | 295 |
| | Stretching temperature of machine direction (° C.) | 90 | 92 | 94 | 95 | 95 | 94 | 94 |
| | Stretch ratio of machine direction | 3.8 | 3.5 | 3.3 | 3.1 | 2.9 | 3.3 | 3.3 |
| | Stretching temperature of transverse direction (° C.) | 110 | 110 | 110 | 115 | 115 | 110 | 110 |
| | Stretch ratio of transverse direction | 4.5 | 4.3 | 4.0 | 3.5 | 3.3 | 4.0 | 4.0 |
| | Pre-shrinkage rate of machine direction (%) | 1.8 | 1.8 | 1.8 | 1.8 | 1.8 | — | — |
| | Pre-shrinkage rate of transverse direction (%) | 0.5 | 0.5 | 0.5 | 0.5 | 0.5 | 0.5 | 0.5 |
| Materials | Average IV of polyester masterbatch | 0.72 | 0.71 | 0.76 | 0.75 | 0.76 | 0.78 | 0.78 |
| Film properties | IV | 0.67 | 0.66 | 0.67 | 0.67 | 0.67 | 0.59 | 0.63 |
| | ΔIV | 0.05 | 0.05 | 0.09 | 0.08 | 0.09 | 0.19 | 0.15 |
| | Initial film haze (%) | 33.2 | 38.2 | 42.1 | 46.5 | 48.6 | 41.8 | 40.5 |
| | Film haze after being heated for 3 hours (%) | 36.7 | 41.2 | 43.8 | 48.3 | 50.4 | 65.1 | 58.1 |
| | Variation in haze (ΔHaze) (%) | 3.5 | 3 | 1.7 | 1.8 | 1.8 | 23.3 | 17.6 |
| | Light transmittance (TT %) | 89.5 | 89.2 | 89.1 | 89.5 | 89 | 87 | 87.2 |
| | Arithmetic mean roughness Ra (μm) | 0.38 | 0.35 | 0.32 | 0.31 | 0.32 | 0.32 | 0.31 |

-continued

| Items | Example 1 | Example 2 | Example 3 | Example 4 | Example 5 | Comparative Example 1 | Comparative Example 2 |
|---|---|---|---|---|---|---|---|
| Ten-point average roughness Rz (μm) | 7.2 | 6.8 | 5.7 | 5.4 | 4.6 | 5.4 | 5.2 |
| Film integrity after being hot pressed | Intact | Intact | Intact | Intact | Intact | Fractured | Fractured |

One of the effects of the present disclosure is that the matte film for hot pressing, in which the substrate layer and the surface layer are each formed from a polyester composition that includes specific amounts of a polyester resin having an intrinsic viscosity between 0.60 dl/g and 0.80 dl/g, an antioxidative ingredient, a nucleating agent, a flowing aid, a polyester modifier and an inorganic filler, can be increased in adaptability and can prevent oligomers from precipitating on the surface of the film in high temperature environments.

Furthermore, in the presence of the polyester modifier with a specific structure, the thermal shrinkage of the polyester film and the movement of oligomers can be suppressed.

The manufacturing method of the matte film for hot pressing of the present disclosure, which pre-shrinks the polyester film in the machine and transverse directions under specific stretch conditions before performing a stretch process, allows the polyester film thus produced to have very low thermal shrinkage rates of the machine and transverse directions in a high temperature environment.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A matte film for hot pressing, comprising:
   a substrate layer; and
   at least one surface layer formed on at least one surface of the substrate layer;
   wherein the substrate layer and the at least one surface layer are formed from at least one polyester composition, and the at least one polyester composition includes:
      81% to 97.9497% by weight of a polyester resin having an intrinsic viscosity between 0.60 dl/g and 0.80 dl/g;
      0.02% to 2% by weight of an antioxidative ingredient;
      0.0003% to 1% by weight of a nucleating agent;
      0.01% to 2% by weight of a flow aid;
      0.01% to 2% by weight of a polyester modifier; and
      0.01% to 2% by weight of an inorganic filler;
   wherein the polyester modifier has a structure represented by formula (I), (II) or (III):

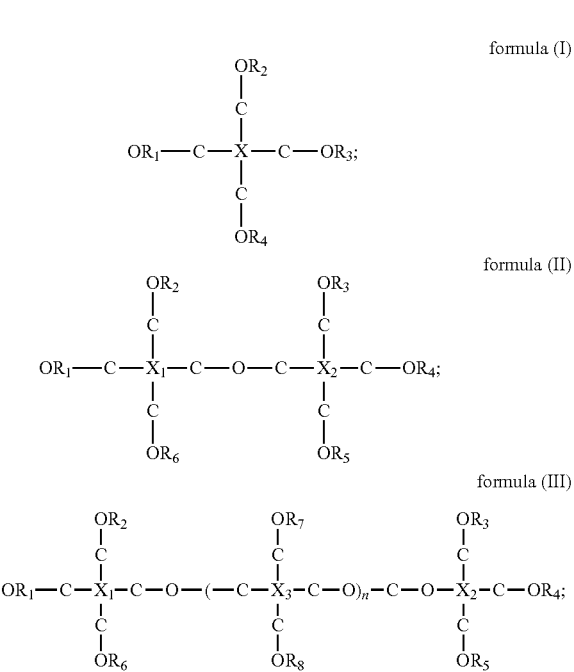

wherein in formula (I), X represents an aliphatic carbon chain or an aromatic carbon chain containing 1 to 5 carbon atoms, and $R_1$ to $R_4$ each represent a hydrogen atom or an aliphatic carbon chain containing 1 to 15 carbon atoms; in formula (II), $X_1$ and $X_2$ each represent an aliphatic carbon chain or an aromatic carbon chain containing 1 to 5 carbon atoms, and $R_1$ to $R_6$ each represent a hydrogen atom or an aliphatic carbon chain containing 1 to 15 carbon atoms; in formula (III), $X_1$ to $X_3$ each represent an aliphatic carbon chain or an aromatic carbon chain containing 1 to 5 carbon atoms, $R_1$ to $R_8$ each represent a hydrogen atom or an aliphatic carbon chain containing 1 to 15 carbon atoms, and n is a positive integer of 1 or more.

2. The matte film according to claim 1, wherein the polyester composition for forming the at least one surface layer further includes 2% to 10% by weight of silica particles each having a particle size between 5 μm and 10 μm.

3. The matte film according to claim 1, wherein the matte film has an arithmetic mean roughness Ra of 0.1 μm to 0.4 μm and a ten-point average roughness Rz of 1 μm to 8 μm.

4. The matte film according to claim 1, wherein a thickness of the matte film is between 15 μm and 350 μm, and a thickness of the at least one surface layer is 2% to 30% of a total thickness of the matte film.

5. The matte film according to claim 4, wherein the thickness of the at least one surface layer is 3% to 20% of the total thickness of the matte film.

6. The matte film according to claim 5, wherein the thickness of the at least one surface layer is 4% to 15% of the total thickness of the matte film.

\* \* \* \* \*